April 15, 1952
E. J. ADAMS
2,592,993
LOADING AND UNLOADING DEVICE
Filed June 14, 1949
2 SHEETS—SHEET 1
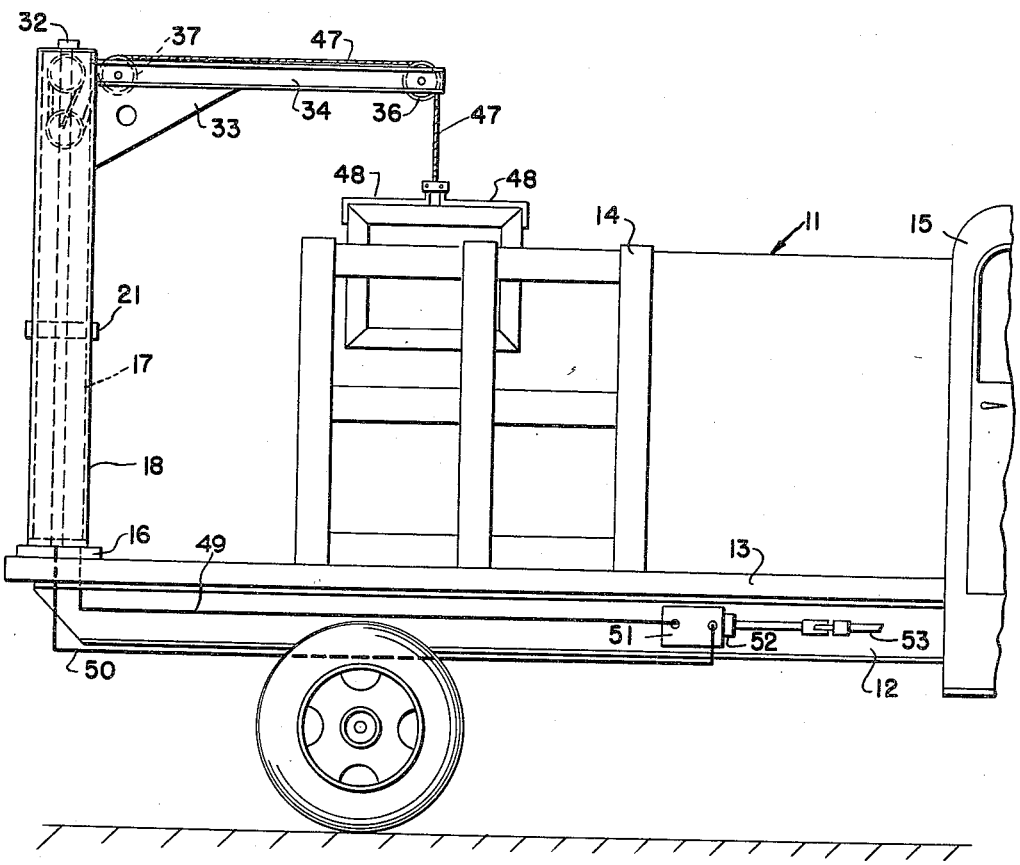
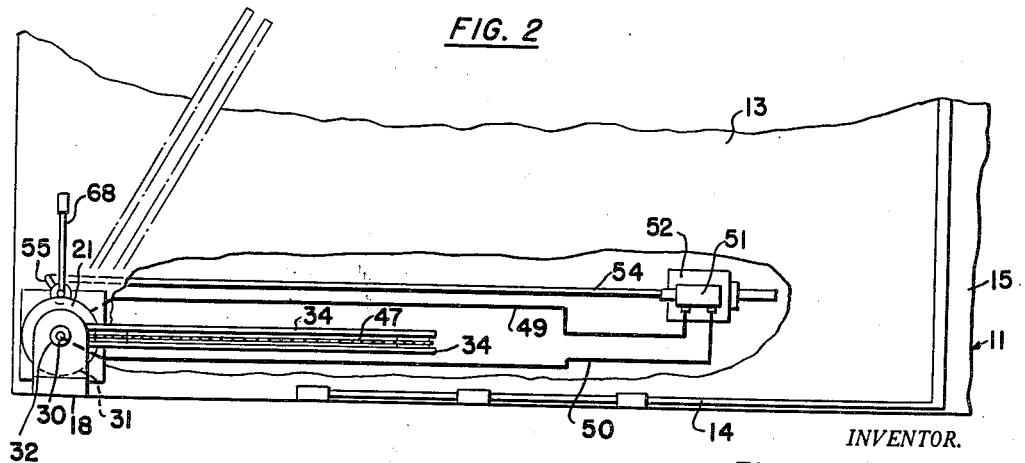
INVENTOR.
ELI J. ADAMS
BY
McMorrow, Berman & Davidson
ATTORNEYS April 15, 1952     E. J. ADAMS     2,592,993
LOADING AND UNLOADING DEVICE
Filed June 14, 1949     2 SHEETS—SHEET 2
FIG. 3
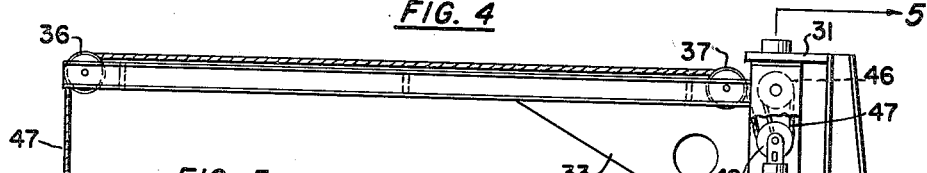
FIG. 4
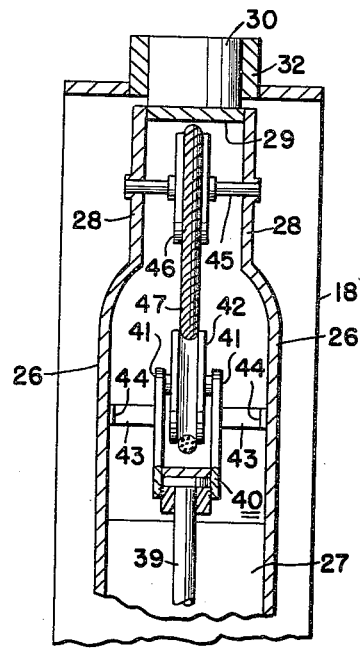
FIG. 5
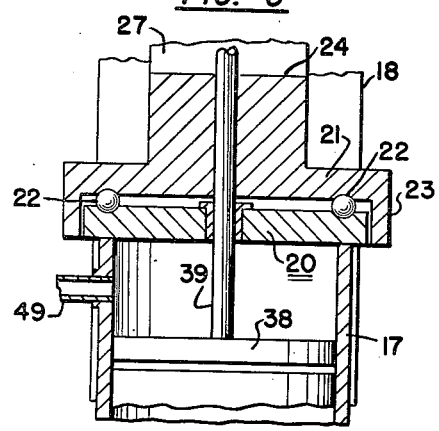
FIG. 6
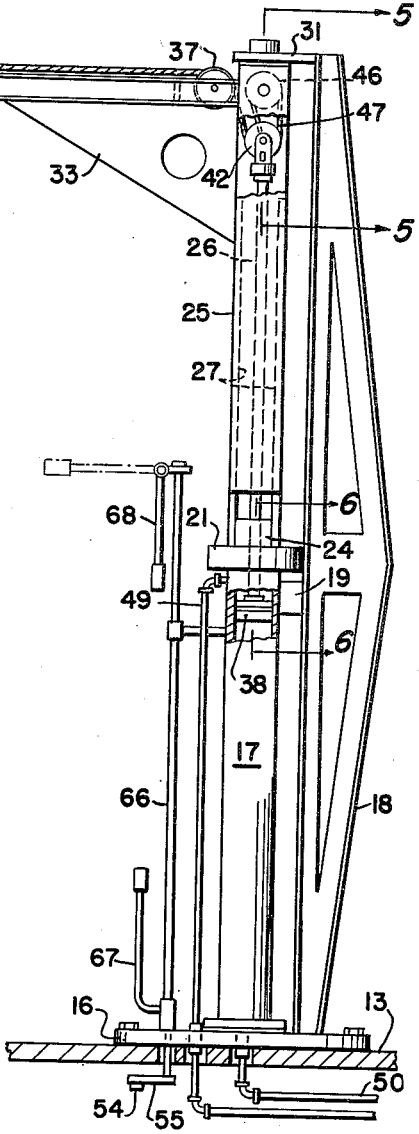
INVENTOR.
ELI J. ADAMS
BY
McMorrow, Berman & Davidson
ATTORNEYS Patented Apr. 15, 1952

2,592,993

UNITED STATES PATENT OFFICE 2,592,993

LOADING AND UNLOADING DEVICE

Eli J. Adams, Rogersville, Mo.

Application June 14, 1949, Serial No. 99,031

2 Claims. (Cl. 212—65)

This invention relates to hoist devices, and more particularly to an improved swinging hoist device particularly adapted for use on a motor truck.

A main object of the invention is to provide a novel and improved hoist device on a motor truck for use in loading heavy material on the truck and unloading same from the truck, said device being very simple in construction, being very easy to operate, and requiring no manual effort on the part of the operator except manipulation of the controls of the device.

A further object of the invention is to provide an improved swinging hoist device for use on a motor truck, said device being operated by fluid-pressure means, involving only a few parts, being rugged in construction, and greatly facilitating loading and unloading operations of the truck.

Further objects and advantages of the invention will become apparent from the following description and claims, and from the accompanying drawings, wherein:

Figure 1 is a side elevational view of the rear portion of a truck equipped with an improved swinging hoist device constructed in accordance with the present invention;

Figure 2 is a fragmentary top plan view, with parts broken away, of a portion of the body of the truck of Figure 1 showing the improved hoist device of the present invention;

Figure 3 is an enlarged top plan view of the boom portion of the improved hoist device shown in Figures 1 and 2;

Figure 4 is a side elevational view, partly in cross-section, of the improved hoist device;

Figure 5 is an enlarged cross-sectional detail view taken on line 5—5 of Figure 4;

Figure 6 is an enlarged cross-sectional detail view taken on line 6—6 of Figure 4.

Referring to the drawings, 11 designates the body of a conventional motor truck, said body including an under frame 12, a floor 13 mounted on said under frame, and side wall elements 14 extending to the operator's cab, shown at 15.

Designated at 16 is a base plate secured to a rear corner portion of the truck floor 13, said base plate having secured thereto the vertically-rising cylinder 17 and the vertically-rising rigid brace beam 18. The upper portion of cylinder 17 is connected to the intermediate portion of brace beam 18 by a plate member 19. The top wall of cylinder 17, shown at 20, has rotatably mounted thereon a support member 21, the opposing surfaces of member 21 and wall 20 being formed with opposed annular grooves receiving ball bearings 22, providing an anti-friction bearing therebetween. Support member 21 has a depending annular outer flange 23 overlying the periphery of the cylinder top wall 20. Said support member is formed with an upstanding axial square stud 24. Designated at 25 is an upstanding rectangular housing having opposing side walls 26, 26 and opposing front and rear walls 27, 27. The lower end portions of walls 27, 27 are secured to opposite sides of stud 24. The upper end portions of walls 26, 26 are inwardly offset, as shown at 28, 28, and are rigidly connected by a horizontal top wall element 29. Rigidly secured to top wall element 29 is an upwardly-projecting cylindrical axial stud 30. The top end of brace beam 18 has a horizontal plate member 31 secured thereto, formed with a vertical bearing sleeve 32 in which the stud 30 is rotatably received.

Projecting laterally from the upper portions of the walls 26, 26 are parallel triangular plates 33, 33, and secured to the top edges of said plates 33, 33 and to the edges of the offsets 28, 28 are the parallel horizontal channel bars 34, 34 connected by spaced transverse plates 35.

Rotatably mounted between the outer ends of bars 34, 34 is a pulley 36 and rotatably mounted between the inner ends of said bars 34, 34 is another pulley 37. Cylinder 17 contains a piston 38 to which is secured a vertical piston rod 39 extending slidably and sealingly through the cylinder top wall 20 and slidably and rotatably axially through the support member 21. Secured to the top end of rod 39 is a yoke member 40 having the spaced upstanding fingers 41, 41. Rotatably mounted between the top ends of fingers 41, 41 is a pulley 42. Secured to the fingers 41, 41 are the respective outwardly-extending shoe members 43, 43 having right-angled end portions 44, 44 slidably engaging the wall members 26, 26 and preventing rotation of yoke member 40 with respect to said wall members.

Secured between the offset members 28, 28 is a shaft 45 having rotatably mounted thereon a pulley 46. Secured to yoke member 40 is one end of a cable 47 which passes over pulley 46, then downwardly around pulley 42, then upwardly over pulley 37, and then over pulley 36. Secured to the end of cable 47 are the conventional pivoted opposing grab hooks 48, 48.

Connected to the top portion of cylinder 17 is a first fluid-pressure conduit 49. Connected to the bottom of said cylinder is a second fluid-pressure conduit 50. The conduits 49 and 50 extend downwardly through base plate 16 and the truck floor 13 and are connected to the ports of a valve 51 mounted on a pump 52 secured to the underframe 12 of the truck. Valve 51 is arranged to selectively admit fluid under pressure to conduit 50 and allow fluid to discharge from conduit 49, and vice versa. The pump 52 is driven from the power take-off shaft 53 of the truck. The valve 51 is operated by a reciprocatory rod 54 extending rearwardly from the valve below floor 13 and pivotally connected to an arm 55 carried by a vertical shaft 66 rotatably mounted in supporting plate 16. Secured to the lower portion of shaft 66 is a first pivoted hand lever 67 and secured to the top end of said shaft is a second pivoted hand lever 68, allowing the rod 66 to be rotated either by an operator standing in the truck, or by an operator standing on the ground adjacent the truck.

At the beginning of a loading operation, the boom structure, comprising the channel bars 34, 34 is in a position swung inwardly of the truck. The operator swivels said boom structure outwardly over the article to be loaded on the truck and operates valve 51 to admit fluid under pressure into the bottom of cylinder 17 through conduit 50, moving the piston 38 to the elevated position shown in Figure 4. This lowers the grab hooks 48, 48. Said hooks are engaged with the article to be loaded and the valve 51 is then reversed, causing piston 38 to be lowered in cylinder 17 by the fluid under pressure admitted into the top portion of the cylinder through conduit 49. This applies tension to cable 47, causing the article to be elevated. The boom structure is then manually swung so as to bring the article into the truck, as shown in Figure 1. The article is then lowered to the truck floor 13 by reversing valve 51 by means of either hand lever 67 or 68. To unload the truck the above-described process is reversed.

Although a specific embodiment of an improved fluid-pressure-operated motor-truck-mounted swinging hoist device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a hoist device for attachment to the frame of a motor vehicle, a vertically disposed fluid pressure cylinder having its lower end resting upon said frame and secured thereto, a vertically disposed hollow housing superimposed upon said cylinder and having the lower end connected to the upper end of said cylinder for rotation about said cylinder upper end, a piston disposed within said cylinder and mounted in the latter for reciprocatory movement, a piston rod having one end secured to said piston and having its other end extending into said housing, a horizontally disposed boom having one end positioned adjacent the upper end of said housing and secured thereto, a rotatable pulley carried by said boom at each end thereof, a flexible cable having one end operatively connected to said other end of said piston rod with an intermediate portion supported on said rotatable pulleys for movement longitudinally of the boom, article engaging means carried by the other end of said cable, and hydraulic means operatively connected to said cylinder for effecting the reciprocatory movement of said piston.

2. In a hoist device for attachment to the frame of a motor vehicle, a vertically disposed fluid pressure cylinder having its lower end resting upon said frame and secured thereto, a support member positioned adjacent the upper end of said cylinder and connected to the upper end of said cylinder for rotation about said cylinder upper end, an upstanding stud carried by said support member, a vertically disposed hollow housing superimposed upon said support member and having the lower end secured to said stud, a piston disposed within said cylinder and mounted in the latter for reciprocatory movement, a piston rod having one end secured to said piston, the other end of said piston rod extending through said support member and stud and into said housing, a horizontally disposed boom having one end positioned adjacent the upper end of said housing and secured thereto, a rotatable pulley carried by said boom at each end thereof, a flexible cable having one end operatively connected to said other end of said piston rod with an intermediate portion supported on said rotatable pulleys for movement longitudinally of the boom, and article engaging means carried by the other end of said cable, and hydraulic means operatively connected to said cylinder for effecting the reciprocatory movement of said piston.

ELI J. ADAMS.

REFERENCES CITED

The following references are of record in the file of this patent:

UNITED STATES PATENTS

| Number | Name | Date |
| --- | --- | --- |
| 420,942 | Kilgore | Feb. 11, 1890 |
| 536,399 | Sawers | Mar. 26, 1895 |
| 655,321 | Anderson | Aug. 7, 1900 |
| 1,137,208 | Hele-Shaw et al. | Apr. 27, 1915 |